Oct. 10, 1961 A. BRUEDER 3,003,604
COMBINED CLUTCH AND TRANSMISSION CONTROL MECHANISM
Filed Dec. 1, 1955 4 Sheets-Sheet 1

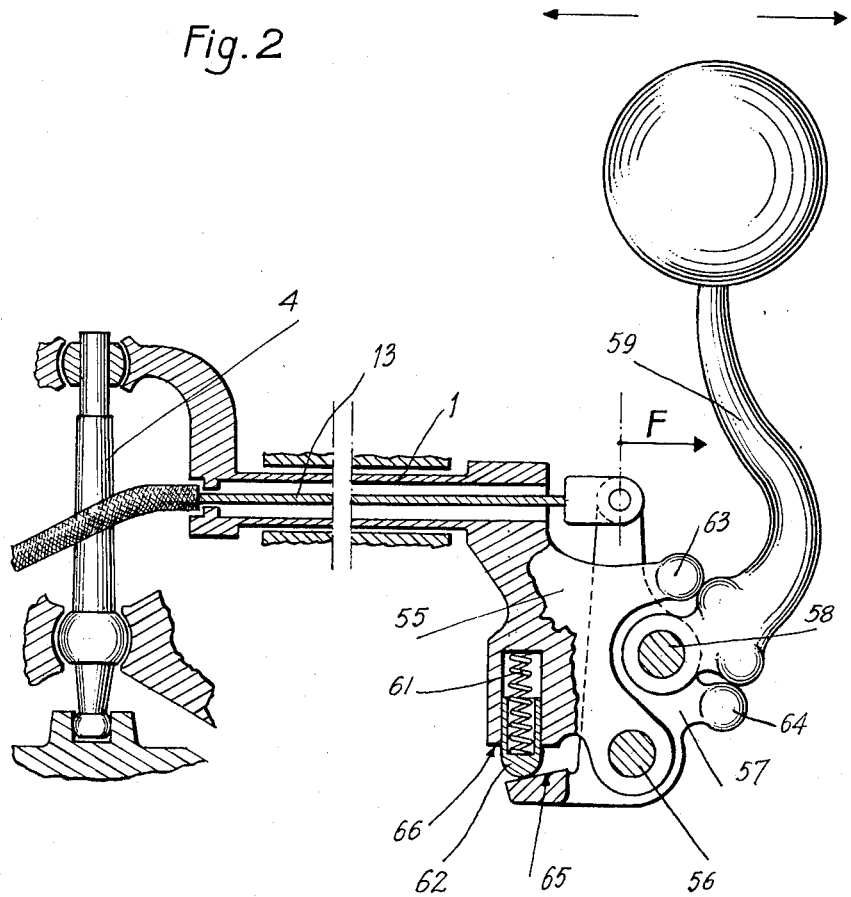

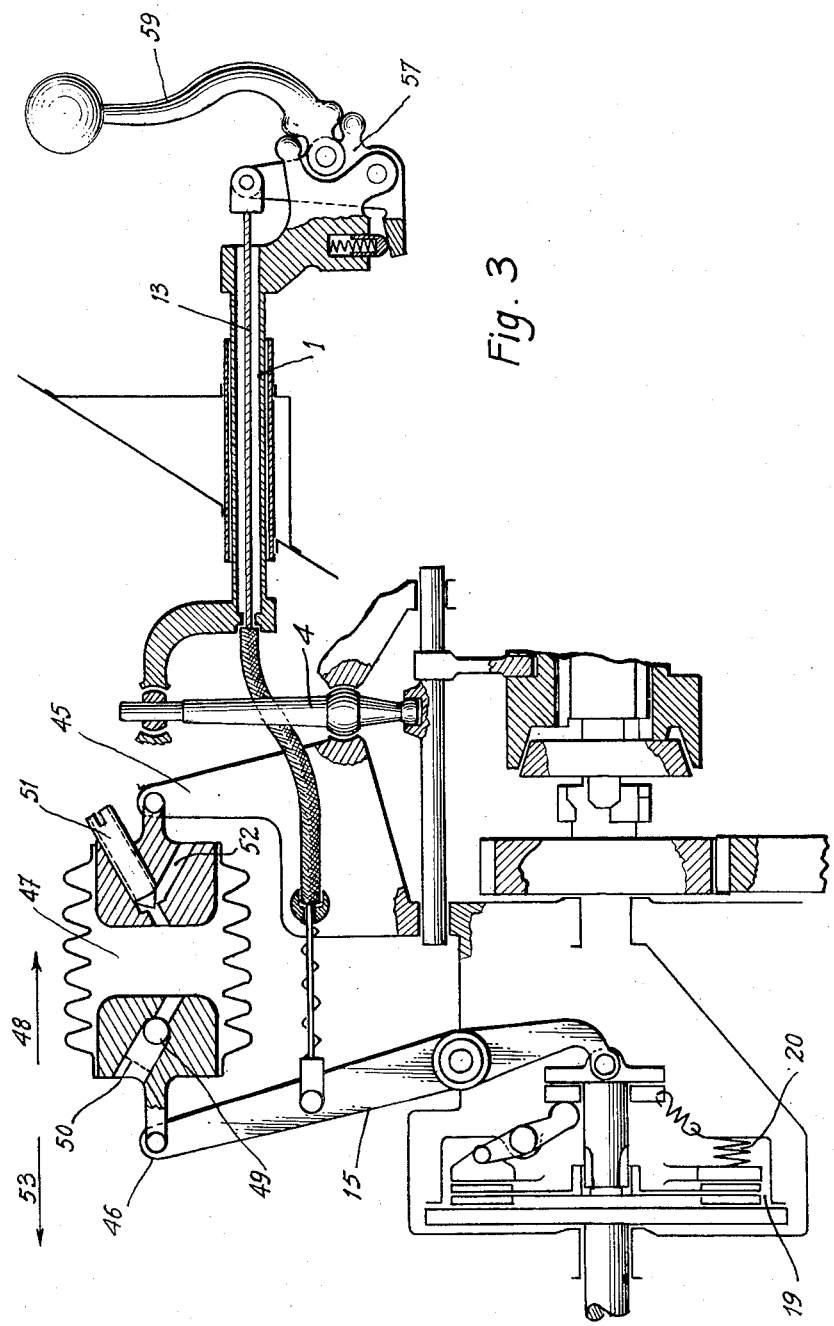

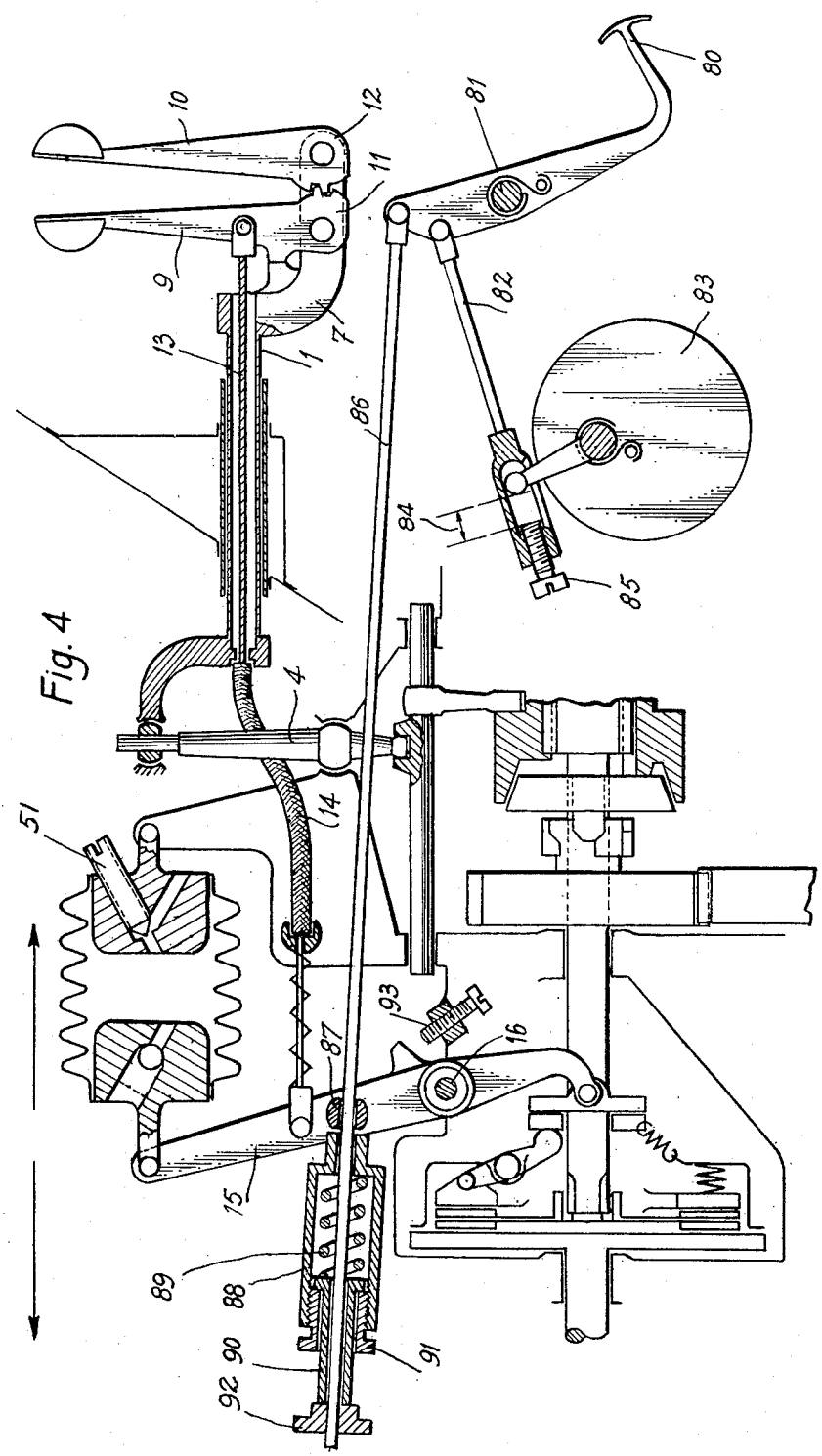

United States Patent Office 3,003,604
Patented Oct. 10, 1961

3,003,604
COMBINED CLUTCH AND TRANSMISSION CONTROL MECHANISM
Antoine Brueder, Paris, France, assignor to Societe Anonyme Andre Citroen, Paris, France, a corporation of France
Filed Dec. 1, 1955, Ser. No. 550,415
Claims priority, application France Dec. 6, 1954
12 Claims. (Cl. 192—3.5)

This invention relates to improvements in clutching and declutching mechanisms as, for example, employed for motor vehicles, and more particularly to mechanical arrangements, whereby control is exercised on a clutch by the shifting of a gear change lever, thus doing away with all necessity for the actuation of any other part, such as a clutch pedal.

In conventional vehicles which make use of mechanical transmission means it is necessary before carrying out a gear changing operation to disengage the engine from the transmission shaft, this operation usually being carried out by the actuation of a pedal which controls a clutch mechanism, the driver thereupon effecting movement of the gear change lever. This, therefore, necessitates two operations, which must be carried out in proper sequence, in order to be able to obtain a correct operation which will not be detrimental to the parts involved.

The invention has for its object to do away with these two separate operations necessitating the use of two different control members, and it achieves an arrangement adapted for vehicles equipped with synchronised gear boxes and mechanical clutches, such that movement by the driver of the gear change lever in the appropriate direction to change from one position to another causes a declutching operation in a positive fashion, the clutch being again let in automatically upon the putting in of the new speed and release of the gear change lever.

According to one important feature of the invention, it is the resistance opposed by the synchronising means to the engaging or meshing of the pinions in respect of the new ratio selected, so long as synchronisation has not been effected, which serves to provide a point of support for the operation of the gear change lever, so that the latter may effect disengagement of the clutch before the gear is changed.

According to one embodiment of the invention, the gear change lever operates by way of a sliding motion and carries a manipulating member comprising two articulated portions connected one to the other in such a way that manipulation of one of them brings about a displacement of the other in the opposite direction, one of them being connected to a clutch-operating lever, so that by one single pulling or pushing movement the user is able at one time to effect release of the clutch and a change over from one speed to another.

According to another embodiment, the manipulating member is formed of a single part articulated to a lever operating the clutch mechanism, this lever being itself articulated to a second lever rigidly connected with the gear change control means, the manipulating member being capable of acting on either of the two levers while bearing against the other.

According to an additional feature, which, although of advantage, is nevertheless not essential, there is provided for the purpose of bringing about a progressive form of return of the clutch into the position of engagement a dash-pot, which provides for a regulable minimum delay in the return into the engaged position irrespective of the manner in which the operation is carried out.

Finally, in order to facilitate manoeuvring at low speeds or when parking, the invention also provides means by which control of the clutch is likewise effected through the medium of an auxiliary brake pedal, which acts on the clutch during a first part of its movement, so that for the purpose of manoeuvring at low speed calling for extreme care, the driver acts by means of successive operations on the one hand on the accelerator and on the other hand on the pedal in question, these two movements being of opposite effect and permitting of a very exact control of the vehicle.

The invention will now be described in greater detail with reference to certain of its embodiments illustrated by way of example in the accompanying drawings, in which:

FIG. 2 is a partial view of another embodiment with a manipulating member formed of one part only;

FIG. 3 is a diagrammatical view of an assembly of the invention including a dash-pot; and FIG. 4 is a diagrammatical view of an assembly of the invention including an auxiliary brake pedal.

Figure 1:
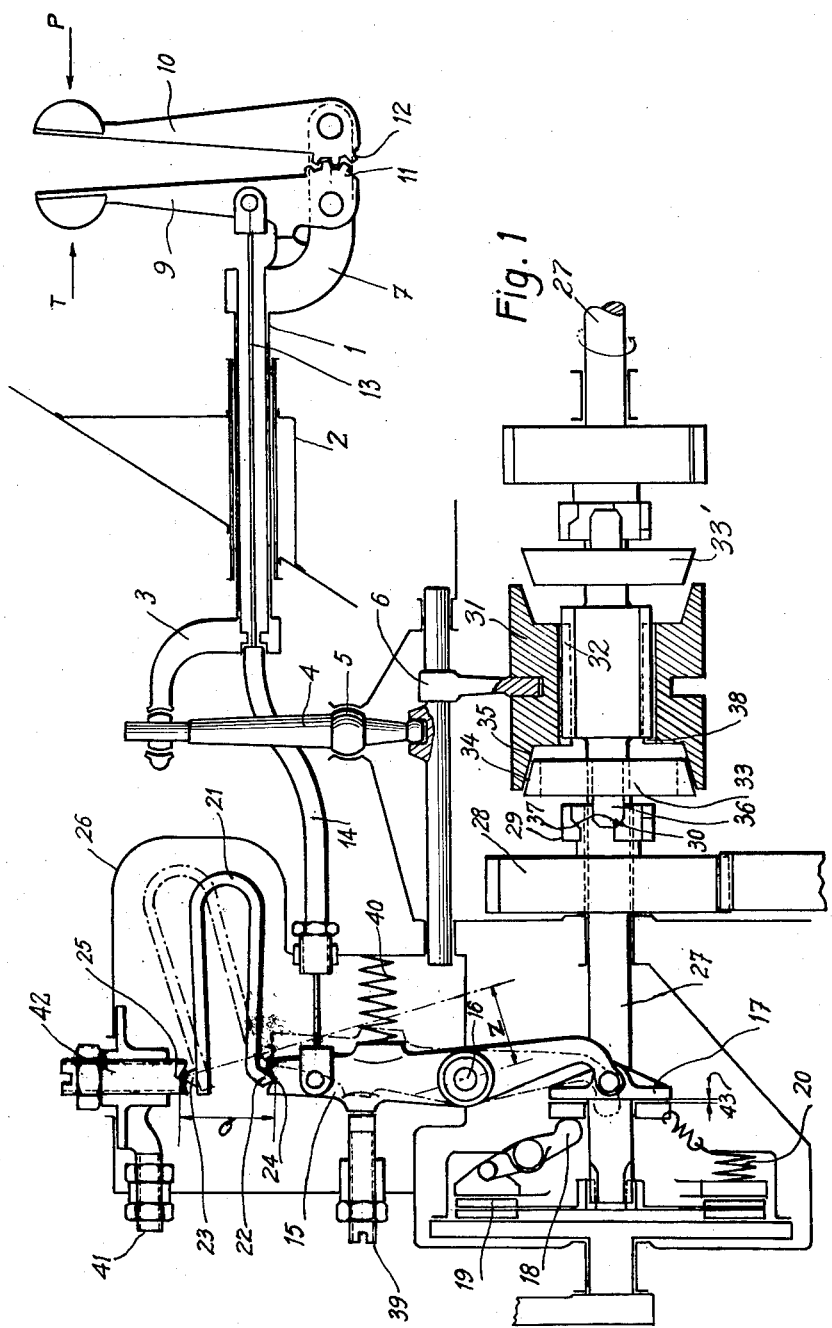
FIG. 1 is a diagrammatical view of an embodiment having a manipulating member composed of two parts.

As already stated, the invention is applicable to vehicles of the type furnished with a mechanical clutch preferably of the friction type, and a gear box, the pinions of which are equipped with synchronising means, the actuating lever for the gear box operating by sliding motion or by rotation.

In referring to FIG. 1, it will be seen that the device comprises, for the control of a change speed gear box, a tubular rod 1 sliding in a fixed part of the body 2. This rod is connected on the one hand, by means of a bent portion 3, to a rod 4 mounted on a spherical member 5 controlling the fork 6, and, on the other hand, by means of a bent portion 7, to a manipulating member. This latter is composed of two elongated members 9 and 10 which normally enclose between them a certain angle. These members are mounted to be capable of a turning movement on the bent portion 7 and mesh one with the other by means of toothed portions 11, 12.

The part 9 of the manipulating member is connected through the medium of a rod 13 and a cable 14 of the Bowden-control type to the end of a lever 15, which is pivoted at 16 and possesses at its opposite end a disc 17 adapted to act on fingers 18 actuating the movable clutch plate 19 in opposition to springs 20.

To assist the pull of the rod 13 on the lever 15, it is desirable, but not essential, to provide an auxiliary device, such as that illustrated in FIG. 1, formed by a bent spring 21 resting under tension by means of its knife-edge ends 22, 23 against the end 24 of the lever 15 and against an abutment 25 integral with the casing 26.

As already stated, the gear box comprises pinions furnished with synchronising elements. In FIG. 1, the gear box is illustrated only in part and shows merely one transmission ratio, but it will be clearly apparent to those skilled in the art that the arrangement is identical with respect to all other gear ratios included in the gear box.

In the construction illustrated, the engine shaft 27 coupled to the clutch carries, mounted loosely thereon, a pinion 28 in rigid connection with a synchronising member 29 having a bevelled portion 30. The synchronising means comprise a sleeve 31, sliding under the action of the fork 6 on the shaft 27 by means of grooves 32, and conical members 33 mounted loosely on the shaft 27, the sleeve and the conical members having co-operating friction surfaces such as surfaces 34 and 35. The conical member also comprises a finger 36 having a bevelled portion 37 co-operating with the bevelled portion 30.

It is to be understood that this arrangement is shown solely by way of example, as the gear box does not fall within the scope of the present invention. It may accordingly be of a completely different kind, the important point being the presence of a change speed gear box comprising synchronsed gears, the speeds being arranged in such a manner as to be capable of being put in by sliding movement or rotation of a control lever.

The operation of the device is as follows:

When the driver wishes to change gears, he actuates the manipulating member either by exerting a pull on the part 9 in the direction of the arrow T or by pushing the part 10 in the direction of the arrow P.

The movement of part 10 in the direction of arrow P is effective since the device is symmetrical and sleeve 31 operates to the right in the drawing with another pinion for another speed.

Since the clutch mechanism is opposed by a resistance in consequence of the springs 20, which retain the clutch in engagement, the rod 13 remains fixed and the force applied is first translated into a sliding movement of the tubular member 1 in its support, and in consequence into a separation of the engaged pinions in the gear box. The sliding movement continues and tends to move into engagement the pinion and member of the new speed, i.e., in the example illustrated, to drive the pinion 28 by the shaft 27 through the medium of the sleeve 31 and the synchronizing or auxiliary member 29. This is possible since, if cone 33 were to move a distance approximately equal to the length of tooth 36 abutting on member 29, the sleeve 31 could move forward sufficiently to engage teeth 38 with the teeth of member 29. However, so long as the speeds of the pinion and the member have not been synchronised, their engagement necessitates an increased amount of force, the bevelled portion 37 of the finger 36 abutting against the corresponding bevelled portion 30 of the member 29, as is well known to those skilled in the art, so that the sliding movement of the tubular member 1 in its support is arrested.

The force applied to the manipulating member being maintained, for example in the direction of the arrow P, it will be seen that as regards a suitable state of equilibrium of the opposing forces the tubular member then forms a fixed bearing point which enables the two parts 9 and 10 to be moved together, and in consequence permits of a pull on the rod 13 and on the cable 14 by reason of the engaging portions 11 and 12.

This pull causes rotation of the lever 15 about its pivot 16 and a pressure of the disc 17 against the fingers 18, so that the movable clutch plate 19 ceases to be supported by the springs 20, causing the clutch to be released. The shaft 27 no longer being driven by the engine, the sleeve 31 carried thereby may then be caused, in consequence of the friction surfaces 34 and 35, to rotate at a speed which is identical with that of the conical member 34, which is subject to thrust by the member 29, the latter being actuated by the pinion 28, which remains in engagement with means rigidly rotating with the wheels of the vehicle. As soon as equality of the speeds has been obtained, the finger 36 may penetrate into a space between the teeth of the member 29, and the teeth of the latter may mesh with the inner teeth 38 of the sleeve 31. This is effected by a subsequent sliding movement of the tubular member 1 in its support, as the resistance which was opposed thereto in consequence of the synchronising means has then disappeared.

Once the gears have been caused to mesh, release of the parts 9 and 10 of the manipulating member again brings about engagement of the clutch under the action of the clutch springs 20 and, if necessary, an auxiliary spring 40 acting on the lever 15, the said parts returning to their original position in which they are angularly separated one from the other.

To facilitate operation of the clutch the invention preferably, although not essentially makes provision for an auxiliary device, which is advantageously formed by the spring 21. The latter is a flat bent spring, one end 23 of which abuts against the part 25 and the other end 22 of which bears against the upper face of the lever 15 by means of vertically aligned knife edge bearings. Pinion 28 remains connected with the steerable wheels of the vehicle so long as there has been no declutching, while sleeve 31 is connected with the engine. The speeds of rotation of pinion 28 and sleeve 31 are different, and since finger 36 moves into position between the two ramps or corresponding beveled portions 30, finger 36 is immediately applied against either one of the beveled portions depending upon whether synchronizing member 29 rotates faster or slower than sleeve 31. At this time, there is relative sliding between the friction surfaces 34 and 35, while any axial thrust on the sleeve 31 is for the sole purpose to increase the frictional force between surfaces 34 and 35 so as to increase the resistance to this movement; hence, finger 36 cannot then be moved beyond the member 29 so that the teeth thereof cannot mesh with the teeth 38.

It will readily be seen that immediately this alignment is destroyed the spring relaxes in consequence of the moving apart of the limbs and exercises a force on the lever, with a lever arm which changes from the value O to the value Z. The resulting torque acts in a declutching sense and reduces in proportion the amount of force which requires to be exerted on the manipulating member 9, 10.

The system will advantageously be calculated in such a way that the torque, although proceeding from zero, will reach at the very commencement of the movement an increased value, which will continue to exist over the entire useful movement. This can be readily achieved, the distance Q between the limbs of the spring and the lever arm Z increasing simultaneously and the spring relaxing.

If it is desired that the torque should be made as great as possible, in order to reduce the amount of force exercised by the driver, it must nevertheless remain less in all positions than that provided by the clutch springs 20, this being produced by simple release of the manipulating member 9, 10.

Various regulating means permit in particular of use to be made of the usual clutch clearance 43 due to an abutment 39 completed by a spring 40, which serves to effect return to the vicinity of the point where the spring 22 is ineffective. In similar fashion a regulating means, such as 41, permits of selection of the exact point of the clutch movement where the spring 21 becomes effective, the tension thereof being regulated by the screw 42.

Finally, it is to be noted that if it is desired solely to disengage the transmission this may be effected by moving the parts 9 and 10 one towards the other by the application of opposite forces according to the arrows T and B. A pull is brought about on the clutch control means.

In FIG. 2, there is shown another embodiment of the manipulating member for changing the speed. It will be seen from this figure that the tubular member 1 actuating the fork of the gear box through the medium of the rocking lever 4 terminates in a crook 55 supporting a pivot 56, on which is mounted a lever 57 actuating the clutch by way of the cable 13. On the lever 57 there is pivoted at 58 a manipuating member 59 controlling the change speed gear.

In the position of rest, a spring 61 acts on the push piece 62 tending to turn the lever 57 about its pivot 56. However, this movement is limited by the lever 59 moved by its pivot 58. It bears against the abutments 63, 64 provided respectively on the support 55 and the lever 57.

The assembly in equilibrium in the position of rest represents the position of engagement of the clutch. Its operation is as follows:

If the speed which it is desired to put in necessitates a pulling movement towards the rear on the part of the tube 1 of the gear control means, the manipulating member 59 is pulled back towards the rear, and this member, finding support by its axis and the abutment 64, acts rigidly with the lever 57. Contact with the abutment 63 ceases when the change speed control tube 1 is momentarily immobilised by the synchronising means, as has already been explained previously; the pivot 56 does not move, the lever 57 exerts a pull on the clutch cable 13 in the direction of the arrow F, and disengagement of the clutch is brought about. The movement is limited by the abutments 65 and 66 moving into contact.

At this moment the end of the movement on the part of the manipulating member 59 causes the selected speed to be put in, synchronisation taking place in the gear box. It is then sufficient to release the manipulating member under the action of the clutch springs, and then the spring 61, and the parts return to the position of engagement of the clutch.

If on the other hand the speed selected necessitates a pushing movement towards the front, the lever 59 bears against the abutment 63, contact with the abutment 64 ceases, and the support 55 and its pivot 56 are momentarily immobilised by the synchronising means. The clutch lever 57, moved by its pivot 58, is drawn in the clutch releasing direction as above, the sequence of operations being similar.

In this way there is obtained a manipulating device for changing the speed which at the same time carries out a movement in a predetermined sense for the purpose of actuating a clutch, whilst the movement of this manipulating member may be effected in the same direction or in the opposite direction according to the speed it is desired to put in. In order to ensure progressive return to the position of engagement of the clutch the arrangement may with advantage include a dash-pot.

Referring to FIG. 3, it will be seen that there is provided between a fixed support 45 and an extension 46 of the lever 15 a dash-pot constituted by an air chamber 47, the volume of which, owing to its deformable walls, for example of the accordion or bellows type, is variable, and which is disposed in such a way that the volume diminishes when the clutch is disengaged, that is to say when the end 46 of the lever 15 moves in the direction of the arrow 48. This chamber comprises a valve constituted by a ball 49 held by a retainer 50. This valve is disposed in such a way that air is able to pass out freely by pushing back the ball. However, the air is unable to enter, as the ball rests on its seat under its own weight and by the effect of the difference in pressure internally and externally. The chamber also comprises a center screw 51, which partially blocks an orifice 52, slowing down air in the one or the opposite direction.

With this arrangement, upon disengagement of the clutch, the air in the bellows escapes by pushing back the ball 49, no resistance being offered to the movement However, if the manipulating member of the change speed gear ceases to be held in the hand, the clutch springs 20 enter into operation and their action is transmitted to the lever 15 in the clutch engaging direction indicated by the arrow 53. There results a tendency for the volume of the bellows to be increased, and accordingly a depression. The ball 49 being moved on to its seating, the passage of air is interrupted. The air is able to enter only by way of the orifice 52, which is controlled by means of the center screw.

Upon the air entering the volume is increased. The depression is always balanced against the pull of the springs 20 and the disc and clutch plates are moved towards each other until the clutch is in engagement.

At this moment the clutch springs, since they abut, cease their pull on the air chamber, and the depression also ceases.

The duration of this operation is regulated at will by the center screw 51, which brakes the entry of the air.

Finally the invention also provides the possibility of associating a clutch mechanism of the kind described in the above with an auxiliary brake pedal, which replaces the usual manual brake lever, so that disengagement of the clutch is effected on each occasion when the said pedal is operated. In the embodiment illustrated in FIG. 4, the auxiliary brake pedal 80, which is pivoted at 81, actuates by means of a lever mechanism 82 the brake 83, although the effective operation of the brake takes place only after a certain movement 84 of the rod 82 regulated by means of the screw 85.

The pedal 80 on the other hand is connected by means of a rod 86 to the lever 15 controlling the clutch releasing action. The rod 86 is pivotally connected to the pedal 80. It slides in an abutment 87 through the lever 15 and terminates in a push device constituted by a cylindrical cage 88, which is traversed axially by the rod 86, and in which is located a spring 89 holding the end collar of a push tube 90 bearing against a regulating nut 91.

The other end of the tube 90 receives the pressure of a screw 92 screwed on to the end of the rod, so that the force proceeding from the pedal 80 is transmitted successively by the rod 86, the nut 92, the tube 90, the spring 89, the cage 88 and the abutment 87 to the lever 15. The nut 91 is previously adjusted in such a way that the spring 89 has a tension slightly in excess of the declutching force, in such a way that it transmits this force without additional flexion.

The nut 92 is thereupon regulated in such a way that, the assembly being at rest, as illustrated, there exists a slight clearance between the cage 88 and the abutment 87, this being so that the clutch will not be impeded in its normal play, the abutment 87 then sliding on the rod 86, this clearance, however, being very small in order not to loose the movement of the pedal.

The device having thus been regulated, the operation is as follows: In the first part of its movement the pedal 80 actuates the rod 86, which effects operation of the clutch lever 15 until the latter is caused to abut against the screw 93. In the second part of the movement of the pedal 80, the rod 86 causes a forward movement of the spring 89 by a sliding of the tube 90 in the immovable cage 88, so that the control mechanism of the brake may freely exercise its action.

In this manner, the pedal of the auxiliary brake ensures disengagement of the engine before the brake is actuated, the co-ordination of these two operations being regulated with all desired precision by means of the screw 85.

What is claimed is:

1. Apparatus comprising a clutch mechanism, a gear change lever, a change speed gear box operatively associated with said lever for control thereby, said change speed gear box having different speed engageable gears and including synchronizing pinions operatively coupled to said clutch mechanism, and means preventing engagement until synchronization is attained, a coupling member coupling said lever to said clutch mechanism for the transmission of forces from said lever to said clutch mechanism, and control means operatively connecting said gear box to said lever and to said coupling member, said control means including a support abutment for said coupling member to permit displacement of said clutch mechanism by said lever, said control means being prevented from undergoing displacement for engagement of any of said gears so long as said preventing means are active and said support abutment permits displacement of said clutch mechanism by said lever.

2. Apparatus as claimed in claim 1 comprising a pivotable lever coupled to said clutch mechanism, said coupling member being operatively connected to said pivotable lever for pivoting the same and controlling said clutch mechanism, and an auxiliary device coupled to said pivotable lever to reduce the force required of said coupling member for the manipulation of said pivotable lever.

3. Apparatus as claimed in claim 1 wherein said coupling member and control means are mechanically intercoupled for relative motion therebetween; said control means comprising a rigid link coupled to and responsive to the gear change lever and a rockable link coupling said rigid link to one of the pinions in said gear box, the movement of said rigid link being restricted until said pinions are synchronized; said coupling member being effective upon restriction of the movement of said rigid link to move relative to said control means for controlling said clutch mechanism.

4. Apparatus as claimed in claim 3 wherein said coupling member comprises a rod, a pivotable link coupled to said clutch mechanism, a cable coupling said rod to said pivotable link for the control of the clutch mechanism; said rigid link being a hollow tube slidably supporting said rod.

5. Apparatus as claimed in claim 4 comprising resilient means engaging said pivotable link for reducing the force necessary to pivot the same.

6. Apparatus as claimed in claim 5 wherein the gear change lever comprises two mutually engaged sections respectively coupled to said rod and rigid link.

7. Apparatus as claimed in claim 5 wherein said resilient means comprises a spring and an abutment sandwiching said spring against said pivotable link to urge the disengagement of the clutch.

8. Apparatus as claimed in claim 5 wherein said rod and rigid link each terminate in a control section, the control sections being pivotally and mutually engaged, said gear change lever controlling the pivotal relationship between said sections.

9. Apparatus as claimed in claim 5 comprising a dashpot coupled to said pivotable link to minimize the time of movement of said pivotable link.

10. Apparatus as claimed in claim 9 wherein said dashpot comprises a bellows for a variable capacity and a control member for controlling the efficacy of said dashpot.

11. Apparatus as claimed in claim 5, wherein the clutch mechanism is mounted in a vehicle provided with a brake mechanism, comprising means coupling said pivotable link with said brake mechanism so that said brake controls said clutch during a predetermined portion of the activation of said brake mechanism.

12. Apparatus as claimed in claim 11 wherein the coupling intermediate said gear change lever and brake mechanism is resilient to regulate the transmission of forces therebetween.

References Cited in the file of this patent

UNITED STATES PATENTS

| | | |
|---|---|---|
| 2,073,692 | Griswold | Mar. 16, 1937 |
| 2,074,476 | Kolb | Mar. 23, 1937 |
| 2,341,756 | Avila | Feb. 15, 1944 |